(12) United States Patent
Jain et al.

(10) Patent No.: US 7,644,179 B1
(45) Date of Patent: Jan. 5, 2010

(54) INTER-VSAN ROUTING WITH NAT

(75) Inventors: Ankur Jain, San Jose, CA (US);
Thomas J. Edsall, Cupertino, CA (US);
Subrata Banerjee, Los Altos, CA (US);
Vinay Gaonkar, Milpitas, CA (US);
Madhava Rao Cheethirala, San Jose, CA (US); Badrinarayanan Ramaswamy, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 567 days.

(21) Appl. No.: 11/292,684

(22) Filed: Dec. 1, 2005

(51) Int. Cl.
*G06F 15/173* (2006.01)
*G06F 15/177* (2006.01)
*G06F 15/16* (2006.01)
*H04L 12/28* (2006.01)

(52) U.S. Cl. ........................ 709/238; 709/245; 709/220; 370/399; 370/409

(58) Field of Classification Search .................. 709/238, 709/245
See application file for complete search history.

(56) References Cited

U.S. PATENT DOCUMENTS

| 6,885,667 | B1 | 4/2005 | Wilson | |
|---|---|---|---|---|
| 7,136,383 | B1 | 11/2006 | Wilson | |
| 7,272,640 | B1 | 9/2007 | Kazemi et al. | |
| 2003/0012204 | A1* | 1/2003 | Czeiger et al. | ............... 370/401 |
| 2003/0118053 | A1* | 6/2003 | Edsall et al. | ................. 370/474 |
| 2003/0131182 | A1 | 7/2003 | Kumar et al. | |
| 2003/0172149 | A1 | 9/2003 | Edsall et al. | |
| 2004/0024908 | A1 | 2/2004 | Valdevit et al. | |
| 2004/0030857 | A1 | 2/2004 | Krakirian et al. | |
| 2004/0230817 | A1 | 11/2004 | Ma | |
| 2005/0018673 | A1* | 1/2005 | Dropps et al. | ............... 370/389 |
| 2005/0025075 | A1* | 2/2005 | Dutt et al. | ................... 370/299 |
| 2005/0036499 | A1* | 2/2005 | Dutt et al. | ................... 370/401 |
| 2006/0010341 | A1* | 1/2006 | Kodama | ......................... 714/6 |
| 2006/0041559 | A1* | 2/2006 | Baldwin et al. | ............... 707/10 |
| 2006/0072587 | A1* | 4/2006 | Ramaswamy et al. | ....... 370/396 |
| 2006/0092932 | A1* | 5/2006 | Ghosh et al. | ................ 370/389 |

OTHER PUBLICATIONS

Monia et al., RFC 4172, "iFCP—A Protocol for Internet Fibre Channel Storage Networking", Sep. 2005.

(Continued)

*Primary Examiner*—Kevin Bates
*Assistant Examiner*—Joe Chacko
(74) *Attorney, Agent, or Firm*—Weaver Austin Villeneuve & Sampson LLP

(57) ABSTRACT

Disclosed are apparatus and methods for facilitating communication between two devices from two different VSANs by propagating each device's presence from a first VSAN to the other device's different VSAN using a network address translation (NAT) mechanism. For instance, a first device, such as a host H1, from VSAN_A is allowed to access data from a second device, such as disk D1, of VSAN_B by propagating D1's presence into VSAN_A and H1's presence into VSAN_B. This awareness is accomplished by propagating an identifier for each device into the edge VSAN of the other device, as well as into any transit VSAN. So as to not duplicate identifiers in any one of the VSANs, a device's presence is propagated into a particular VSAN by assigning an unused domain for use by such device in the particular VSAN.

22 Claims, 11 Drawing Sheets

OTHER PUBLICATIONS

Gibbons et al., RFC 4369, "Definitions of Managed Objects for Internet Fibre Channel Protocol (iFCP)", Jan. 2006.

Brocade, XPath OS, Administrator's Guide, Publication No. 53-1000177-01, Publication Date: Jan. 26, 2005.

Dutt et al., "Fibre Channel Switch That Enables End Devices in Different Fabrics to Communicate With One Another While Retaining Their Unique Fibre Channel Domain_IDS", U.S. Appl. No. 10/609,442, filed Jun. 26, 2003.

Dutt et al., "Fibre Channel Switch That Enables End Devices in Different Fabrics to Communicate With One Another While Retaining Their Unique Fibre Channel Domain_IDS", U.S. Appl. No. 10/791,143, filed Mar. 1, 2004.

Office Action dated Oct. 3, 2008 for U.S. Appl. No. 11/316,027.

Office Action dated Apr. 16, 2009 for U.S. Appl. No. 11/316,027.

* cited by examiner

INTER-VSAN ROUTING WITH NAT

BACKGROUND OF THE INVENTION

The present invention relates to storage area networks. More particularly, it relates to virtual storage area networks (VSANs) and routing between different VSANs.

With the increasing popularity of Internet commerce and network centric computing, businesses and other organizations are becoming more and more reliant on information. To handle all of this data, storage area networks or SANs have become very popular. A SAN typically includes a number of storage devices, a plurality of hosts, and a number of Switches arranged in a switching fabric that connects the storage devices and the hosts.

Most SANs rely on the Fibre Channel protocol for communication within the Fabric. For a detailed explanation of the Fibre Channel protocol and Fibre Channel switching fabrics and services, see the Fibre Channel Framing and Signaling Standard, Rev 1.70, American National Standard of Accredited Standards Committee (NCITS), Feb. 8, 2002, and the Fibre Channel Switch Fabric-2, Rev. 5.4, NCITS, Jun. 26, 2001, and the Fibre Channel Generic Services-3, Rev. 7.01, NCITS, Nov. 28, 2000, all incorporated by reference herein for all purposes.

In Fibre Channel, each device (hosts, storage devices and switches) is identified by a globally unique, eight (8) byte wide World Wide Name (WWN) assigned by the manufacturer. When the Fibre Channel devices are interconnected to form a SAN, the WWN (along with other parameters) is the primary mechanism to identify each device. Fibre Channel frames are used for communication among the devices in the SAN. The WWN, however, is not used by the frames. Each device must login to the FC network and is then dynamically assigned a unique Fibre Channel address (FCID) by the Fabric. The FCID is used in FC networks for end devices to communicate with each other.

The three byte wide FCID is hierarchically structured into three fields, each one byte long: Domain_ID, Area_ID, and Port_ID. Each switch within the Fabric is assigned a Domain_ID. The end devices attached to a particular switch are assigned the Domain_ID of that switch. The switch manages the allocation of the Area_ID and Port_ID fields for each end device to guarantee the uniqueness of the assigned addresses in that Domain. For example, if a switch is assigned a Domain number five and the switch subdivides its address space in two areas each having three connected end devices, then a possible Fibre Channel address allocation is: 5:1:1, 5:1:2, 5:1:3, 5:2:1, 5:2:2, and 5:2:3.

The U.S. patent application Ser. No. 10/034,160, filed Dec. 26, 2001, entitled "Methods and Apparatus for Encapsulating a Frame for Transmission in a Storage Area Network", which application is incorporated herein by reference for all purposes, introduces the concept of a Virtual SAN or "VSAN". The implementation of a VSAN is based on the concept of dividing the switching fabric of a SAN into logical SANs, each called a VSAN. The properties of each VSAN are similar to a standard SAN. In particular, Fibre Channel identifiers (FCIDs) are assigned per VSAN. This means that a given FCID may be assigned to two different hosts in two different VSANs. Within each VSAN, a frame is forwarded as in any normal SAN, using the FCID.

It is desirable in certain instances to enable communication between different VSANs. For example, a first VSAN may wish to use a disk in a different second VSAN for backing up its own disks. One known solution for enabling end devices in different VSANs to communicate with one another involves the virtualization of the end devices so that there are "local instances" of each end device in each VSAN. See U.S. patent application Ser. No. 10/609,442, filed 26 Jun. 2003, entitled "A Fibre Channel Switch That Enables End Devices in Different Fabrics to Communicate with One Another While Retaining Their Unique Fibre Channel Domain_IDs", which application is incorporated herein by reference. In general, each device's FCID is propagated to each VSAN so that the device appears to be present in each VSAN. Although this solution works well in several applications, such a mechanism breaks down when an FCID of a device that is to be propagated into a particular VSAN is already assigned to a device already present in the particular VSAN. This duplication of an FCID in a single VSAN would result in an error.

Accordingly, there is a need for improved inter-VSAN routing mechanisms that allow communication between devices that reside in different VSANs.

SUMMARY OF THE INVENTION

The present invention provides methods and apparatus for facilitating communication between two devices from two different VSANs by propagating each device's presence from a first VSAN to the other device's different VSAN using a network address translation (NAT) mechanism. For instance, a first device, such as a host H1, from VSAN_A is allowed to access data from a second device, such as disk D1, of VSAN_B by propagating D1's presence into VSAN_A and H1's presence into VSAN_B. This awareness is accomplished by propagating an identifier for each device into the edge VSAN of the other device, as well as into any transit VSAN. So as to not duplicate identifiers in any one of the VSANs, a device's presence is propagated into a particular VSAN by assigning an unused domain for use by such device in the particular VSAN.

In one embodiment, a method to facilitate of routing data between different virtual storage area networks (VSANs) is disclosed. The method generally includes the following operations: (a) at a border switch that belongs to a first VSAN and a second VSAN, receiving data that indicates that a new device has joined the first VSAN and provides a first Fibre Channel identifier (FCID) for the new device, wherein the first FCID is usable to address the new device in the first VSAN; (b) when the new device is authorized to communicate with a remote device and the border switch is positioned in a path between the new device's first VSAN and the remote device's VSAN, assigning a second FCID for use in a second VSAN that is adjacent to the first VSAN so that the assigned second FCID has a domain identifier that was unused by the second VSAN prior to the assignment; (c) storing a binding between the first and second FCID for later use by the border switch for translating between the first and second FCID for data subsequently received into the border switch; and (d) from the border switch, informing other switches in the second VSAN of the new device and its second FCID.

In a particular aspect, the domain identifier of the second FCID is predefined by a user, and in another aspect, selection of the domain identifier of the second FCID is predefined by a user. In a specific implementation, the binding between the first and second FCID is stored in a NAT (network address translation) table associated with the border switch. In a further aspect, a first name server directory listing registered devices is updated in the first VSAN and a second name server listing devices registered is updated in the second VSAN. In another embodiment, when data is received into the border switch from the new device in the first VSAN and its destination is in the second VSAN or in another VSAN that can be reached through the border switch, a source FCID of the data is translated from the first FCID to the second FCID based on the stored binding for the new device and then the translated data is forwarding the data towards the new device. When data is received into the border switch from the second VSAN and its destination is the new device in the first VSAN, a destination FCID of the data is translated from the second FCID to the first FCID based on the stored binding for the new device and this translated data is then forwarding the device towards its destination.

In a specific implementation, the new device corresponds to a physical device that is not positioned in the first or second VSAN, but resides in a third VSAN located by traversing through the first and second VSAN, and wherein the new device's joining of the first VSAN was accomplished by performing operations (a) through (d) with respect to the third and first VSANs. In another aspect, operation (b) is only performed if it is determined that none of the other one or more border switches in the first and second VSAN have initiated handling of the new device and the method further includes when it is determined that another border switch in the first and second VSAN has initiated handling of the new device, receiving a second FCID from another border switch of the first and second VSAN for the new device's representation in the second VSAN. The method further includes when it is not determined that another border switch in the first and second VSAN has initiated handling of the new device, sending the binding between the first and second FCID to one or more other border switches that reside in the first and second VSANs, In yet a further aspect, operation (d) is only performed after all of the other border switch(es) of the first and second VSAN have stored their bindings between the first and second FCID.

In another embodiment, the invention pertains to an apparatus operable to facilitate the routing of data between different virtual storage area networks (VSANs). The apparatus includes one or more processors and one or more memory. At least one of the memory and processors are adapted to provide at least some of the above described method operations.

In an alternative embodiment, the invention pertains to a system for routing data between different virtual storage area networks (VSANS). The system includes a plurality of VSANS, wherein each VSAN is coupled to at least one other VSAN, wherein each adjacent pair of VSANs includes at least one border switch, and each VSAN includes one or more host(s) and/or storage disk(s). The border switches are each configured to facilitate communication between authorized hosts and/or disks across multiple VSANs, wherein each border switch accomplishes this by performing one or more of the above described methods.

These and other features of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

Figure 1:
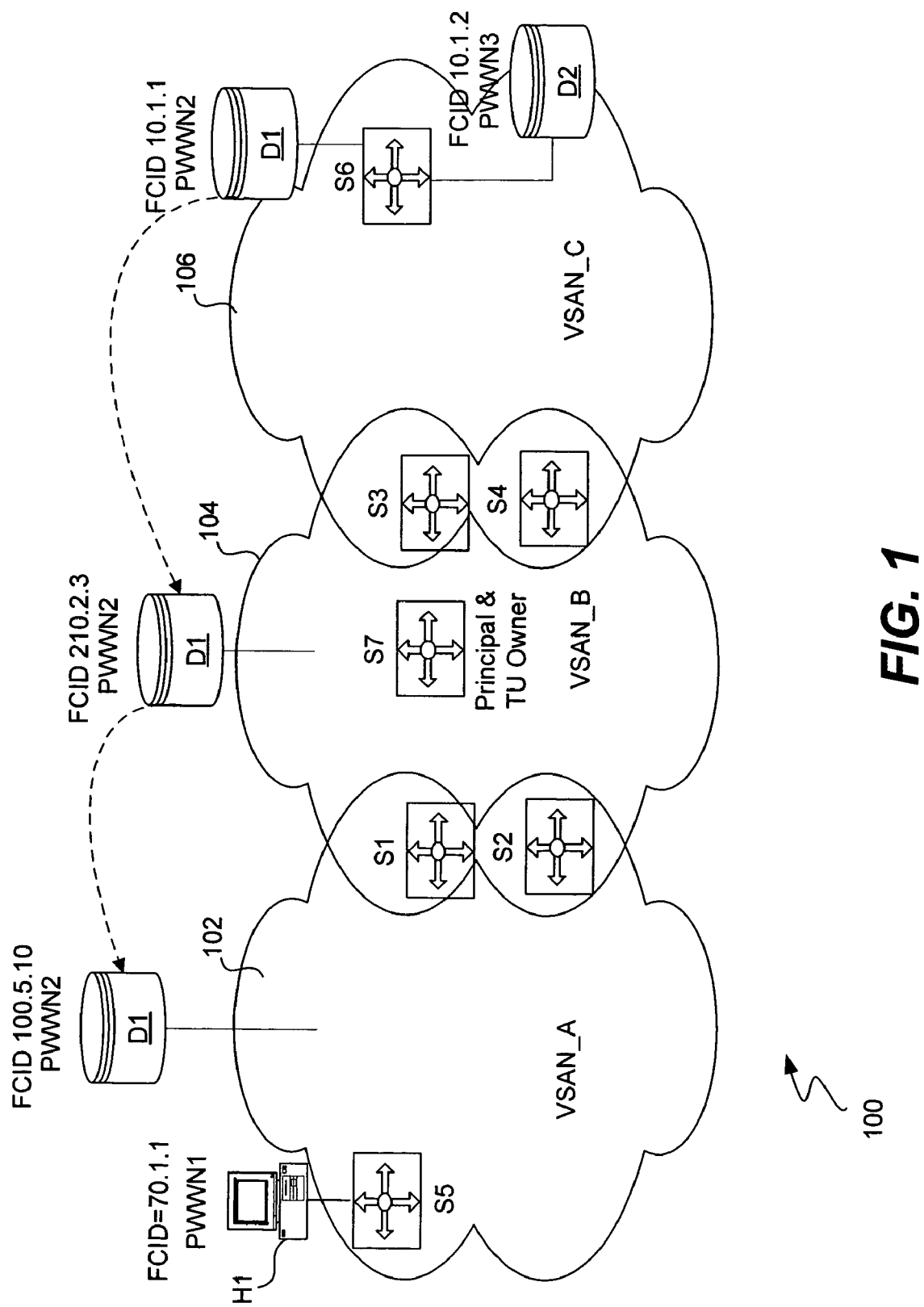
FIG. 1 is a block diagram illustrating an exemplary storage area network (SAN) having multiple virtual SANs (VSANs) in which various embodiments of the invention may be implemented.

FIG. 1 is a block diagram illustrating an exemplary storage area network (SAN) 100 having multiple virtual SANs (VSANs) in which various embodiments of the invention may be implemented. The configuration of FIG. 1 will also be used to illustrate the inventive mechanisms described below. As shown, the SAN 100 includes a first VSAN_A 102, a second VSAN_B 104, and a third VSAN_C 106 that are contiguously coupled together. That is, VSAN_A is coupled to VSAN_B, which is coupled to VSAN_C. VSAN_A and VSAN_C are referred to as edge VSANs for end devices H1, D1, and D2, while VSAN_C is referred to as a transit VSAN that is positioned between the end device's VSANs. Of course, FIG. 1 represents merely one example of a multiple VSAN fabric in which techniques of the present invention may be practiced. The fabric may have any number of VSANs and each VSAN may be coupled to one or more other VSANs. Another example fabric is represented in FIG. 6C.

SAN 100 may be in the form of any suitable data access system, such as a bank's financial data center, for handling requests for data as initiated by any suitable type of entity, such as a customer's host or client computer (not shown). Of course, a plurality of hosts/clients (not shown) typically would be able to access such a SAN 100. In current networks, the client typically sends requests to SAN 100 via a wide area network, such as the Internet (not shown). A SAN may also implement virtualization as described further below, and such a network may be partitioned into two or more virtual storage area networks (e.g., VSAN_A, VSAN_B, VSAN_C).

In the illustrated example, data may be read from, as well as written to, various portions of a plurality of storage devices of a particular VSAN in response to commands sent by a remote client to one or more servers or hosts, e.g., host H1 of VSAN_A. In general, the data may be accessed by any number of hosts or clients although not illustrated in FIG. 1. Communication among the storage devices and hosts is accomplished by coupling the storage devices and hosts together via one or more switches, routers, or other network devices/nodes configured to perform switching functions. One or more switches may also communicate with one another via an inter switch link. As shown, VSAN_A includes switches S1, S2, and S5; VSAN_B includes switches S1, S2, S3, S4, and S7; and VSAN_C includes switches S3, S4, and S6. Some switches may reside in two or more VSANs, such as switches S1~S4, and these switches are referred to as "border switches."

Although the network devices described above with reference to FIG. 1 are described as switches, these network devices are merely illustrative. Thus, other network devices such as routers may be implemented to receive, process, modify and/or generate packets or frames with functionality such as that described herein for transmission in a storage area network. Moreover, the above-described network devices are merely illustrative, and therefore other types of network devices may be implemented to perform the disclosed inventive embodiments.

In some of the discussion herein, the functions of switches of this invention are described in terms of the SCSI protocol. This is because many storage area networks in commerce run a SCSI protocol to access storage sites. However, the present invention may be implemented using any suitable device connectivity protocol, besides SCSI. Currently, storage area networks also employ the Fibre Channel (FC) protocol (FC-PH (ANSI X3.230-1994, Fibre Channel-Physical and Signaling Interface) as a lower level protocol and runs IP (Internet Protocol) and SCSI on top of Fibre Channel. Note that the invention is not limited to any of these protocols and may be applied to any protocol, such as FC, iSCSI, FCIP, iFCP, Eternet, FV, etc. For example, the higher level protocols need not include SCSI. For example, this may include SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the described procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a virtual or physical device that performs an operation requested by an initiator. For example, a target physical or virtual memory disk will obtain or write data as initially requested by a host initiator. Note that while the host initiator may provide instructions to read from or write to a "virtual" target having a virtual address, a fabric switch (or some other mechanism) first converts those instructions to a physical target address before instructing the target.

In certain cases, an initiator (e.g., H1) in a first VSAN (e.g., VSAN_A) can be allowed to access data on a target (e.g., D1 or D2) in a second VSAN (e.g., VSAN_C). Ideally, SCSI targets, such as storage disks or physical logic units (PLUNs), are directly accessible by SCSI initiators (e.g., hosts). Similarly, even when VLUNs (virtual logical units) are implemented, the VLUNs are visible and accessible to the SCSI initiators. Accordingly, each initiator requires knowledge of its available targets, even when such targets physically reside in a different VSAN than the initiator.

Inter VSAN Routing (IVR) with NAT

In general, the present invention provides mechanisms for facilitating communication between two devices from two different VSANs by propagating each device's presence from a first VSAN to the other device's different VSAN using a network address translation (NAT) mechanism. For instance, a first device, such as a host H1, from VSAN_A is allowed to access data from a second device, such as disk D1, of VSAN_B by propagating D1's presence into VSAN_A and H1's presence into VSAN_B. This awareness is accomplished by propagating an identifier for each device into the edge VSAN of the other device, as well as into any transit VSAN. So as to not duplicate identifiers in any one of the VSANs, a device's presence is propagated into a particular VSAN by assigning an unused domain for use by such device in the particular VSAN. As shown in FIG. 1, disk D1 is assigned FCID 10.1.1 for VSAN_C, FCID 210.2.3 for VSAN_B, and FCID 100.5.110 for VSAN_A. That is, disk D1's presence is propagated into VSAN_B as FCID 210.2.3 and propagated into VSAN_A by FCID 100.5.10.

Figure 2:
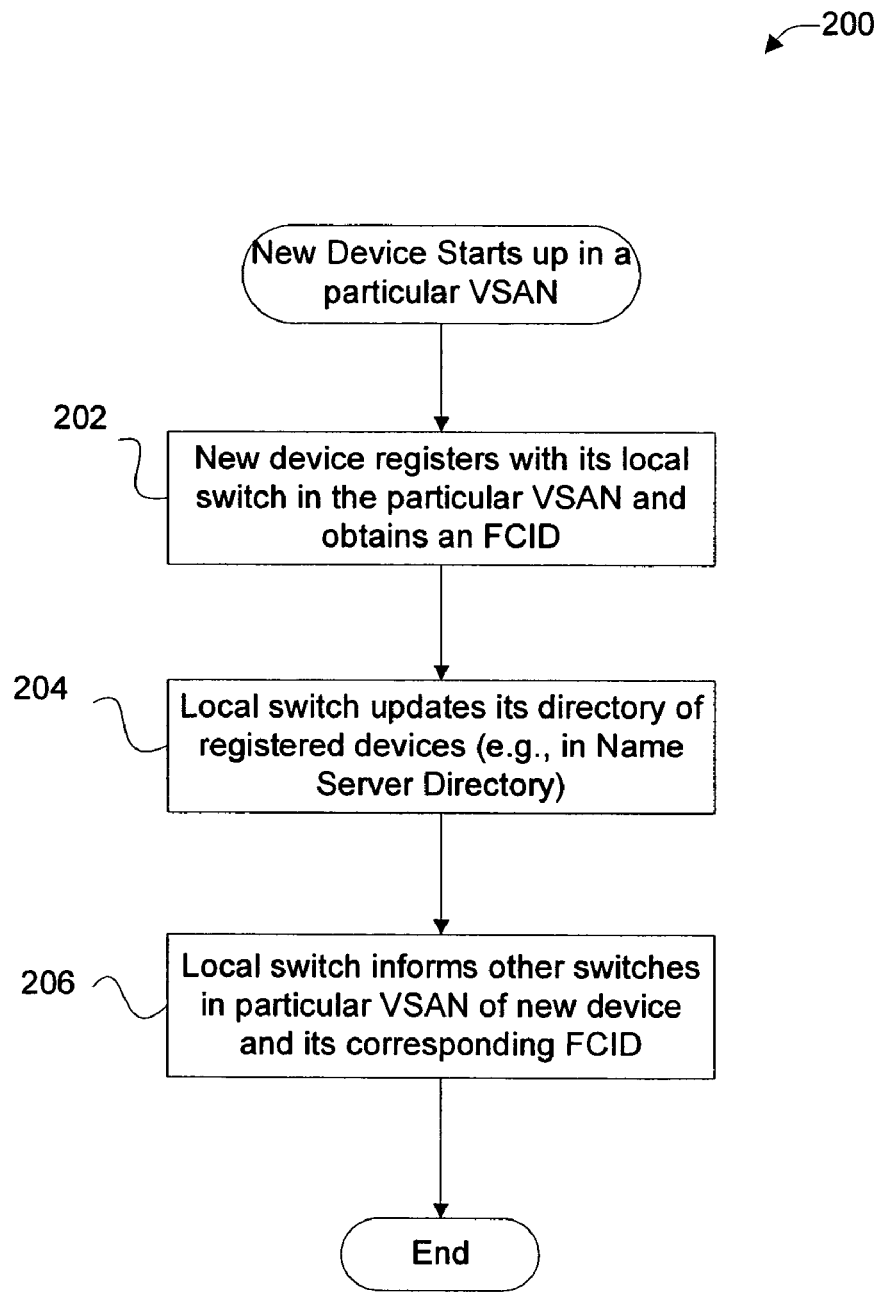
FIG. 2 is a flow chart illustrating a procedure 200 for propagating a new device's presence within its own VSAN.

FIG. 2 is a flow chart illustrating a procedure 200 for propagating a new device's presence within its own VSAN. When a new device is added to a particular VSAN and coupled with a particular local switch, it registers with its local switch and obtains an FCID in operation 202. For instance, disk D1 of FIG. 1 is initially coupled to local switch S6 and registers with switch S6. In one implementation, registration is in the form of a Fibre Channel FLOGI procedure and includes an exchange of identifying information. During this registration handshaking, the new device provides information about itself, such as device type and its world wide name (WWN) to the local switch. There are several kinds of WWNs used in FC networks. If you consider a device with one or more FC adapters (or HBAs or ports) to connect to a FC network, every device is assigned a node WWN (NWWN) and each adapter is assigned a port WWN (PWWN). The NWWN and PWWN are different from each other. The PWWNs and NWWN are typically fixed and preconfigured in each device during manufacturing of the device. In the current example, disk D1 of FIG. 1 will specify to local switch S6 that it is a target and has identity "PWWN2." Likewise, when disk D2 registers with its local switch S6, disk D2 informs switch S6 that it is a target and has identity "PWWN3." In another example, host H1 of FIG. 1 informs its local switch S5 that it is an initiator and has identifier "PWWN1."

In return for a new device's world wide name identifier, the local switch then assigns an FCID to the new device. In general, the FCID assigned to the new device has a same domain identifier as the local switch and a unique area and port identifier. In the example of FIG. 1, switch S6 has domain "10." Accordingly, disks D1 and D2 that are coupled with this switch S6 will be assigned an FCID with a same domain "10" and a unique area and port identifier. As shown, disk D1 is assigned FCID 10.1.1 (domain=10, area=1, port=1), while disk D2 is assigned FCID 10.1.2 (domain=1, area=1, and port=2).

The local switch also tracks all devices that are currently registered with it in a registered device directory. Accordingly, after a new device registers with its local switch, the local switch will update is directory of registered devices in operation 204. For example, each local switch compiles a list of its registered devices in a Name Server Directory. Each entry in a Name Server directory may include any suitable information for tracking each registered device, such as the device's PWWN, the device's FCID, the type of protocol (SCSI, IP, etc.) the device supports, and if the device is an initiator (i.e., a host) or a target (i.e., a storage device or disk).

The local switch also initiates propagation of the change to its directory of registered devices (e.g., Name Server Directory) to other switches in the same VSAN. The border switches may maintain separate Name Server directories for each of its VSANs. For example, when disk D1 is added to VSAN_C, an entry for D1 is added to the Name Server Directory of switch S6, the Name Server Directory of S3 for VSAN_C, and the Name Server Directory of S4 for VSAN_C.

Figure 3:
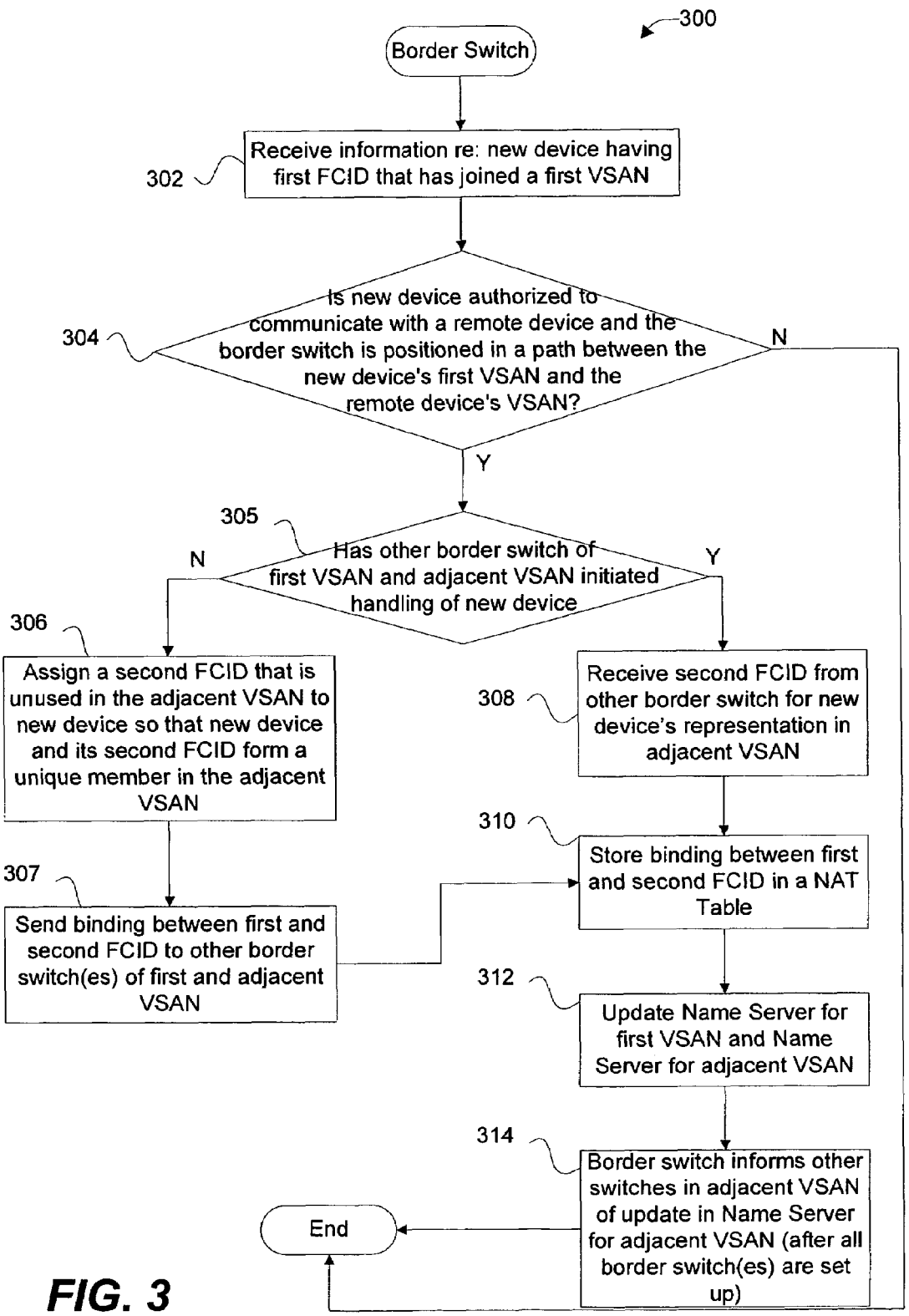
FIG. 3 is a flow chart illustrating a procedure for propagating information regarding new devices from a first VSAN to an adjacent VSAN in accordance with one embodiment of the present invention.

When information regarding a new device reaches a border switch, the new device may be propagated into the adjacent VSAN in certain situations. This propagation may be accomplished by any suitable mechanism so that unique identities are maintained in each adjacent VSAN for the new device. FIG. 3 is a flow chart illustrating a procedure 300 for propagating information regarding a new device from a first VSAN to an adjacent VSAN in accordance with one embodiment of the present invention. This procedure 300, of course, is implemented for each set of new device information that is received into a border switch.

Figure 4:
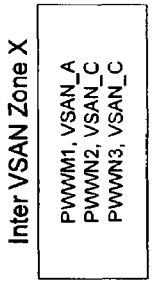
FIG. 4 illustrates an example Inter VSAN Zone X, which is preconfigured in one or more of the switches of the different VSANs.

Initially, information regarding a new device having a first FCID that has joined a first VSAN is received in operation 302. For example, a Name Server Directory update for D1 is sent from switch S6 to border switch S3, and this update includes FCID 10.1.1 for D1 in VSAN_C. It is then determined whether the new device is authorized to communicate with a remote device and the border switch is positioned in a path between the new device's first VSAN and the remote device's VSAN in operation 304. This step may be accomplished in any number of ways. In one implementation, the border switch initially determines whether another device in a VSAN that differs from the new device's VSAN is allowed to communicate with the new device by examining its Inter VSAN Zone configurations for the presence of the new device. FIG. 4 illustrates an example Inter VSAN Zone X, which is preconfigured in one or more of the switches of the different VSANs. Inter VSAN Zone X specifies that device having PWWN1 of VSAN_A (or H1) may communicate with device PWWN2 of VSAN_C (or D1). In sum, border switch S3 and S4 can determine from Inter VSAN Zone X that a device of VSAN_A is authorized to communicate with D1 of VSAN_C.

The border switch also needs to know the fabric topology to determine whether it resides in a path between the new device and an authorized device in a different VSAN than the new device's VSAN. The border switch may be manually preconfigured with the entire fabric's topology or learn this topology by automated topology discovery mechanisms described further below. The topology specifies, among other parameters, how the VSANs are coupled together.

In a specific example, border switch S3 receives a Name Server update regarding disk D1 that includes identifier PWWN2. This information regarding disk D1 that is received into the border switch S3 will be associated with a particular VSAN, for example, by the received data having a VSAN tag or by the port of the border switch into which the information arrives having a particular VSAN association. Thus, border switch S3 can determine that the information regarding disk D1 originates from VSAN_C or has passed through VSAN_C. Border switch S3 also determines from the Inter Vsan Zone configuration and Name Server database for VSAN_C that D1 belongs to VSAN_C and has PWWN2 and that disk D1 from VSAN_C is authorized to communicate with a device PWWN1 from VSAN_A. Switch S3 can also determine from the known fabric topology that VSAN_A is coupled to VSAN_B. Since the information regarding new disk D1 is arriving from VSAN_C and VSAN_A is reachable through VSAN_B (known from the topology), border switch S3 then knows that it is positioned in a path between the two authorized devices and in which direction to propagate disk D1's information, i.e., into VSAN_B.

If it is not determined that the new device is authorized to communicate with another VSAN's device in a different VSAN or that the border switch is in the communication path, the new device's information is not propagated into the adjacent VSAN and the procedure 300 ends. However, when it is determined that the new device is authorized to communicate with another VSAN's device in a different VSAN and that the border switch is in the communication path, it may also be determined whether another border switch has initiated handling of the new device (e.g., by setting up the new device's presence in the adjacent VSAN) in operation 305. That is, if another border switch has already initiated a process for making the new device's presence known in the adjacent VSAN, the current border switch does not duplicate this process performed by the other border switch. In a specific example, when a border switch receives information about a new device that is authorized to communicate with another VSAN device, this border switch sends a query message to the other one or more border switches (if present), asking whether they have initiated the process of propagation of the new device's presence in the adjacent VSAN. The other border switches will return answers of "yes" or "no" indicating whether they have started the propagation process.

If another border switch has not initiated propagation of the new device into the adjacent VSAN, a second FCID that is unused in the adjacent VSAN is then assigned to the new device for use in the adjacent VSAN so that the new device and its second FCID form a unique member in the adjacent VSAN in operation 306. In a specific implementation, a domain that is unused in the adjacent VSAN is assigned as part of the second FCID. That is, a new domain is assigned to each new device that is propagated into the adjacent VSAN. In another implementation, a single domain that is unused by the switches present in the adjacent VSAN may be used for all new devices of each VSAN that are propagated into the adjacent VSAN. In the example of FIG. 1, the device D1 and D2

(as well as other devices) of VSAN_C may share a same domain "210" (not shown for D2) for propagation into VSAN_B.

A new FCID may be assigned for a new device in a particular VSAN in any particular manner. In one implementation, each VSAN includes an elected "principal" switch that is responsible for assigning domains to other switches. A non-principal switch may request a domain assignment from the principal switch in its VSAN. For instance, border switch S3 may request a new domain for new device D1 of VSAN_C from principal switch S7 of adjacent VSAN_B, and principal switch S7 assigns domain "210" for use by the new device with respect to VSAN_B.

The principal switch may assign a new domain randomly or using a particular algorithm (e.g., sequentially assign new domains) or user configured preference. The requesting switch may also request a particular domain (perhaps that is predefined by a user) from the principal switch, and the requested domain is assigned if the principal switch determines that it is unused by other switches, besides the requesting switch, in the VSAN. After the second FCID is assigned to the new device for the adjacent VSAN, the binding between the first and second FCID for the new device may be sent to the other border VSANs in the first and adjacent VSANs in operation 307.

If it was determined that another border switch has already initiated propagation of the new device into the adjacent VSAN, the second FCID for the new device's representation in the adjacent VSAN is merely received into the current border switch in operation 308 and operations 306 and 307 for assigning and sending the second FCID are skipped.

No matter how the second FCID for the new device is obtained, the binding is stored, for example, in a NAT Table in operation 310. The Name Server directory for the first VSAN and the Name Server Directory for the adjacent VSAN are both updated for the current border switch in operation 312. That is, an entry for the new device and first FCID are added to the Name Server Directory for the first VSAN and an entry for the new device and second FCID are added to the Name Server Directory for the adjacent VSAN.

The border switch then informs the other switches in the adjacent VSAN of the update to its Name Server Directory for the adjacent VSAN in operation 314. In order to prevent data being routed through border switches that have not yet set up their NAT Table, propagation of the new device into the adjacent VSAN may be deferred until all of the border switches have completed their NAT entries for such device. In one implementation, when a border switch completes its NAT entry for a particular device, it informs the other border switches. Alternatively, each border switch may make periodic queries to the other border switches as to their status regarding a particular new device.

The above described procedure for propagating a new device from a first VSAN into an adjacent VSAN (e.g., procedure 300 of FIG. 3) is preferably implemented in each border switch of the multiple VSAN arrangement. Additionally, each new disk or target and each new initiator or host is propagated through the multiple VSANs when authorized to communicate with other devices in such multiple VSANs using the propagation techniques described above. For the devices of FIG. 1, if host H1 and disks D1 and D2 are authorized to communicate with each other, each of these devices will be propagated across VSANs A~C.

Figure 5:
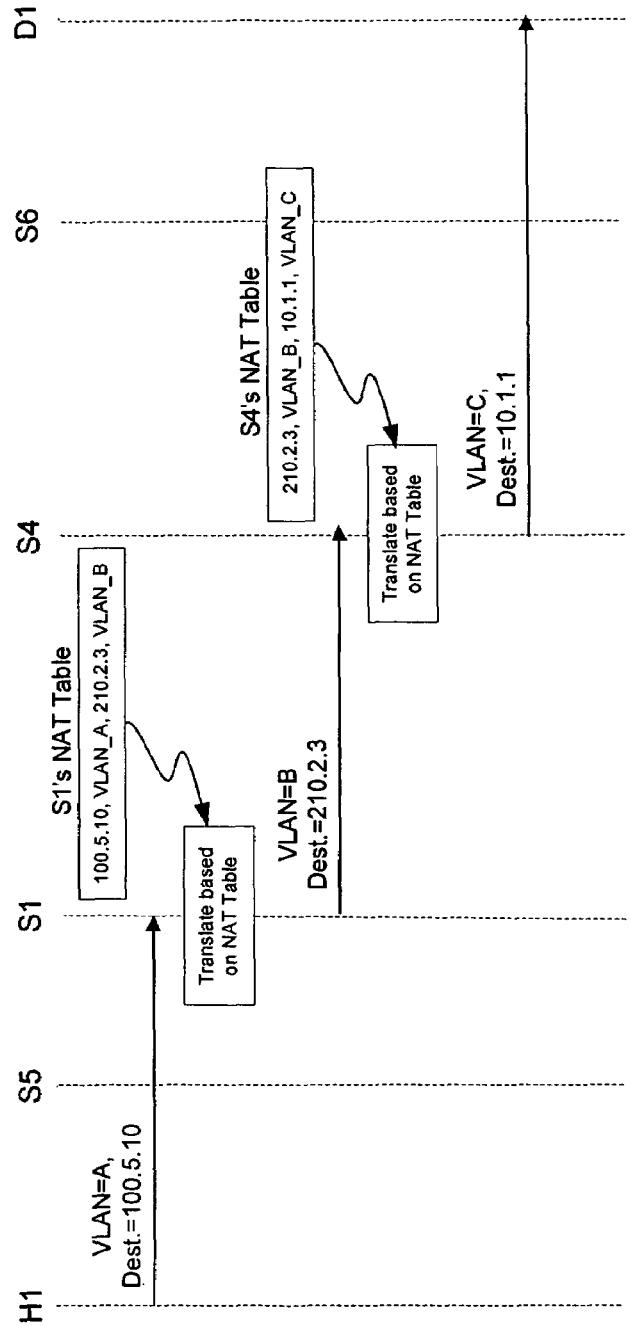
FIG. 5 is a communication diagram illustrating data being sent from host H1 of VSAN_A to disk D1 of VSAN_C in accordance with one embodiment of the present invention.

After the information for two devices in two different VSANs has been propagated across the edge (and transit if applicable) VSANs, data may then be sent between these two devices. FIG. 5 is a communication diagram illustrating data being sent from host H1 of VSAN_A to disk D1 of VSAN_C in accordance with one embodiment of the present invention. As shown, data having destination 100.5.10 and associated with VLAN_A (e.g., by a VSAN tag or port association) is sent from host H1. Destination 100.5.10 is the FCID of D1 in VSAN_A. This data is routed to border switch S1 and then translated by S1 based on S1's NAT Table. Specifically, the data's destination 100.5.10 is translated to 210.2.3 and the data is associated with VSAN_B (by giving the data a new VSAN_B tag or by sending the data out the port associated with VSAN_B). Destination 210.2.3 is the FCID of disk D1 in VSAN_B. When the data reaches border switch S4, it is again translated, but using the S4's NAT Table. Specifically, the destination is translated to 10.1.1 and the data is associated with VSAN_A. Destination 10.1.1 corresponds to the real disk in VSAN_C, and, accordingly, the data is routed to its final destination D1.

Dynamic Discovery and IVR Distribution of Topology

The topology of the fabric may be configured in each fabric switch manually or dynamically. Preferred embodiments of the present invention include mechanisms for dynamically discovering topology in each VSAN of a multiple VSAN system and distributing topology for each VSAN dynamically across the multiple VSANs.

The routing protocol FSPF (Fabric Shortest Path First) continues to be used in each VSAN to distribute topology changes in each VSAN among the switches in such VSAN. Of course, any other suitable routing distribution protocol may be utilized. FSPF is a link state path selection protocol. FSPF keeps track of the state of the links on all the switches in a VSAN and associates the cost with each link. The protocol computes paths from each switch to all the other switches in the particular VSAN by adding the cost of all the links traversed by the path, and choosing or selecting the path that minimizes the cost. The collection of the link state records (LSR's) (including the cost) of all the switches in the VSAN constitutes the topology database of the VSAN, called the Link State Database.

The FSPF protocol has at least four major components, including: (i) a "Hello" protocol used to establish connectivity between neighbor switches, to establish the identity of neighbor switches, and to exchange FSPF parameters and capabilities between the neighbor switches; (ii) a replicated fabric topology or Link State Database, with protocols and mechanisms to keep the databases synchronized across the VSAN; (iii) a path computation algorithm; and (iv) a routing table update.

The Link State Database synchronization in turn has at least two major components, an initial database synchronization and an update mechanism. The initial database synchronization is used when a switch is initialized or when an inter-Switch Link (ISL) comes up. The update mechanism is used when either (i) there is a link state change, for example when an ISL goes up or down; or (ii) on a periodic basis, to prevent switches from deleting topology information from the database.

With the FSPF protocol, the term "path selection" indicates the lowest cost or "best" path between a source and destination in the VSAN. The term "routing" indicates the actual forwarding of frames to a specific destination. FSPF performs hop-by-hop routing, which means that a switch in the VSAN only needs to know the next hop on the best path to the destination. The replicated topology database insures that every switch in the VSAN has the same definition of the VSAN, and therefore, all the switches will make consistent routing decisions. Typically, a switch needs to know, for each destination domain in the VSAN, which path should be used to route a frame to a domain. A routing table entry therefore requires at a minimum a destination Domain_ID and an E_Port to which frames are forwarded.

Since the FSPF protocol is contained within a VSAN, in order to support routing for domains that are in other VSANs, a mechanism for propagating a topology change from a particular VSAN into the other VSANs of the fabric are provided herein. This may be accomplished by any suitable mechanisms.

In one embodiment, a topology update (TU) Owner is elected in each VSAN to handle distributing of each VSAN's topology across multiple VSANs. In FIG. 1, switch S7 is designated as the TU Owner of VSAN_B. Likewise, VSAN_A and VSAN_C will each include a designated TU owner (not shown). Any suitable mechanism may be utilized to elect a TU Owner in each VSAN. In one example, the switch with the highest switch wwn may be elected as the TU Owner. Any suitable criteria (such as domain, speed, bandwidth, etc.) may be used to determine which switch to elect as the TU Owner.

Figure 6A:
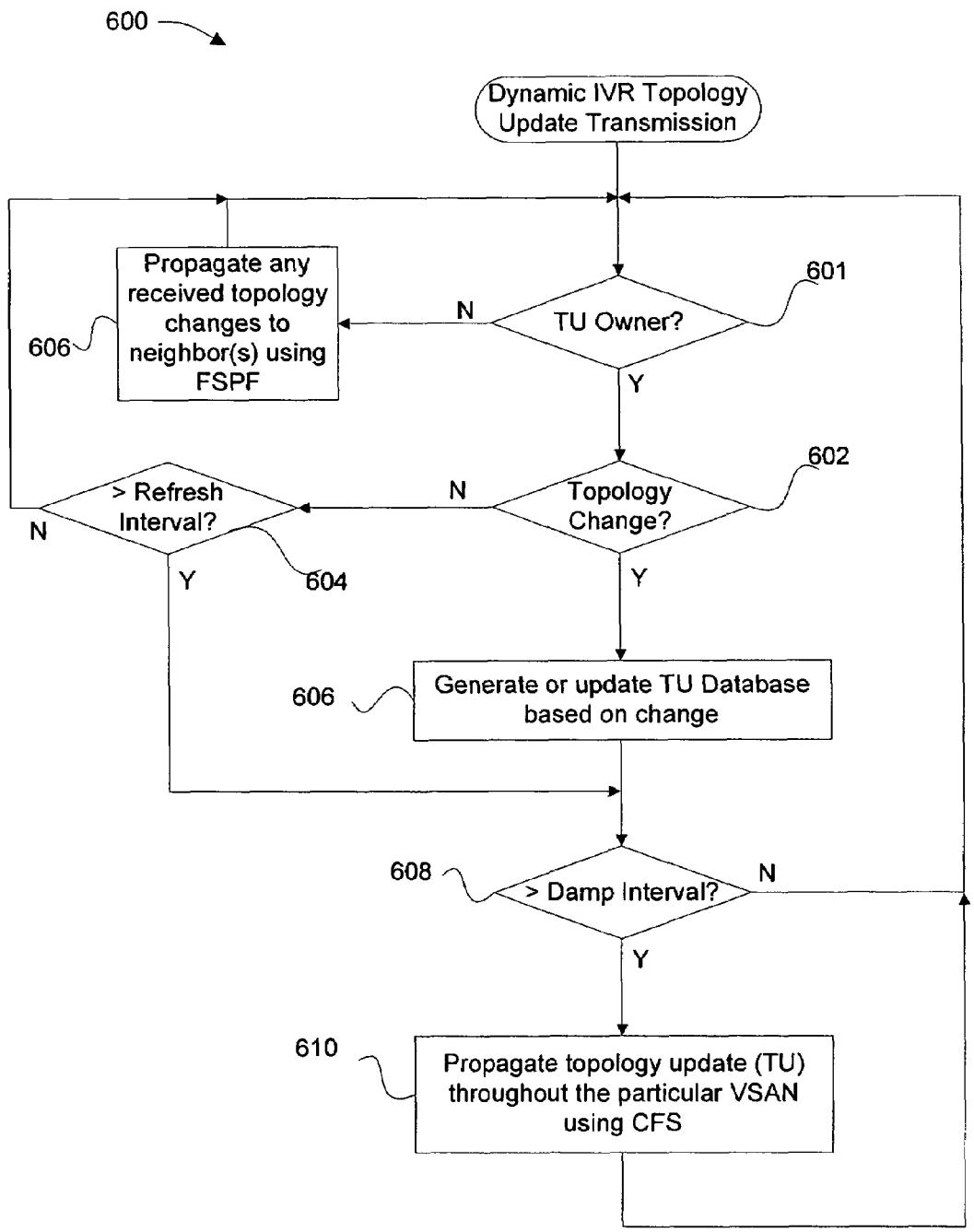
FIG. 6A is a flow chart illustrating a procedure for dynamically discovering and then transmitting IVR topology updates (TUs) in accordance with one implementation of the present invention.

FIG. 6A is a flow chart illustrating a procedure 600 for dynamically discovering and then transmitting IVR topology updates (TUs) in accordance with one implementation of the present invention. This procedure 600 outlines the operations performed from the perspective of a switch in a particular VSAN although the procedure is actually applied in one or more switch(es) of each VSAN of the fabric.

Initially, it may be determined whether the current switch is a TU Owner in operation 601. If the current switch is not the TU Owner, it merely propagates any topology changes in the current switch's particular VSAN using FSPF (or any other suitable protocol). If the current switch is the TU Owner of the particular VSAN, it then may be determined whether a topology change has occurred in the current VSAN in operation 602. Changes to the topology may include adding one or more new switch(es) to the particular VSAN, removing one or more switch(es) from the particular VSAN by any mechanism (e.g., manual removal by a user, failure of a switch, disabling of a switch by a user or software agent, etc.), connecting existing switches in a new configuration, etc.

If a topology change has occurred (e.g., the TU Owner has received a topology update via FSPF), the TU Owner then generates or updates its TU database for the particular VSAN based on such topology change in operation 606. If a topology change has not occurred or been received, the process may simply wait for a topology change to occur prior to performing a topology update operation. In the illustrated example, if a topology change has not occurred, it may then be determined whether a Refresh Interval has passed in operation 604. The Refresh Interval may be used to periodically perform a topology update. The value of the Refresh Interval depends on the switch and network capabilities. On current switches, 45 seconds works well for a Refresh Interval.

In either mode of performing a periodic update or performing an update based on a topology change, it may first be determined whether a minimum Damp Interval has been reached prior to an update in operation 608. This operation is optionally performed so as to avoid overwhelming other switches with too many TU updates in case the topology is changing very quickly. The value of the Damp Interval also depends on the switch and network capabilities. On current switches, 10 seconds works well for a Refresh Interval.

After the minimum Damp Interval has been reached, the TU Owner then sends this topology change to all switches in the entire fabric using Cisco Fabric Services (CFS) in operation 610. CFS generally provides a mechanism for sending any type of data to all switches in the entire fabric. When a change is detected by the TU Owner, it forms a CFS message that includes the topology change. The CFS message generally contains a field indicating that it includes data that should be sent throughout the fabric and an application field indicating the use of such data. For example, the application field will indicate that this is an "TU Topology Update" application. This CFS message is propagated from the TU Owner to its neighbor switches, and the neighbor switches automatically perform the following operations based on the application field "TU Topology Update": update their topology databases, update their routing tables, and forward the CFS message to their neighbor switches as described further below. The procedure then repeats.

In another aspect of the present invention, CFS may also be used to propagate Inter VSAN zones across multiple VSANs. For example, the TU Owners or any other inter VSAN enabled switch or router may be initially configured with an Inter VSAN zone (e.g., by a user) and the configured switch then automatically generates a CFS message that indicates an "Inter VSAN zone propagation" application and includes the configured Inter VSAN zone data. This CFS message is automatically sent to the entire fabric using CFS, and each receiving switch obtains the new configured Inter VSAN zone data.

Referring back to FIG. 6A, the TU that is propagated may take any suitable form that specifies the topology of the transmitting VSAN. In one implementation, the TU is in the form of a table that includes a list of all of the switches in the transmitting VSAN. Preferably, the TU also indicates the transmitting VSAN's TU Owner so that the TU Owner's absence from the VSAN may be detected and a new TU elected to replace the missing TU Owner as explained further below. In general, when a TU Owner shuts down or fails, it is no longer transmitting TU's to the switches, but the other switches continue to receive topology updates for their own VSAN via FSPF. The receiving switches for a particular VSAN will store the TU Owner for their particular VSAN and periodically determine whether the TU Owner switch goes absent from the topology updates propagated via FSPF.

FIG. 6C illustrates an example fabric having multiple VSANs. As shown, the fabric includes VSAN1, VSAN2, VSAN3, VSAN4, and VSAN6. VSAN1 includes IVR enabled switches S1, S2, and S3; VSAN2 includes IVR enabled switches S1 and S4; VSAN3 includes IVR enabled switches S2, S3, S4, and S5; VSAN4 includes IVR enabled switches S4, S5, and S6; while VSAN6 includes IVR enabled switch S6. Of course, each VSAN may include other switches that are not IVR enabled and will not show up in the topology discovery techniques of the present invention and are not need to practice techniques of the present invention.

Figure 6B:
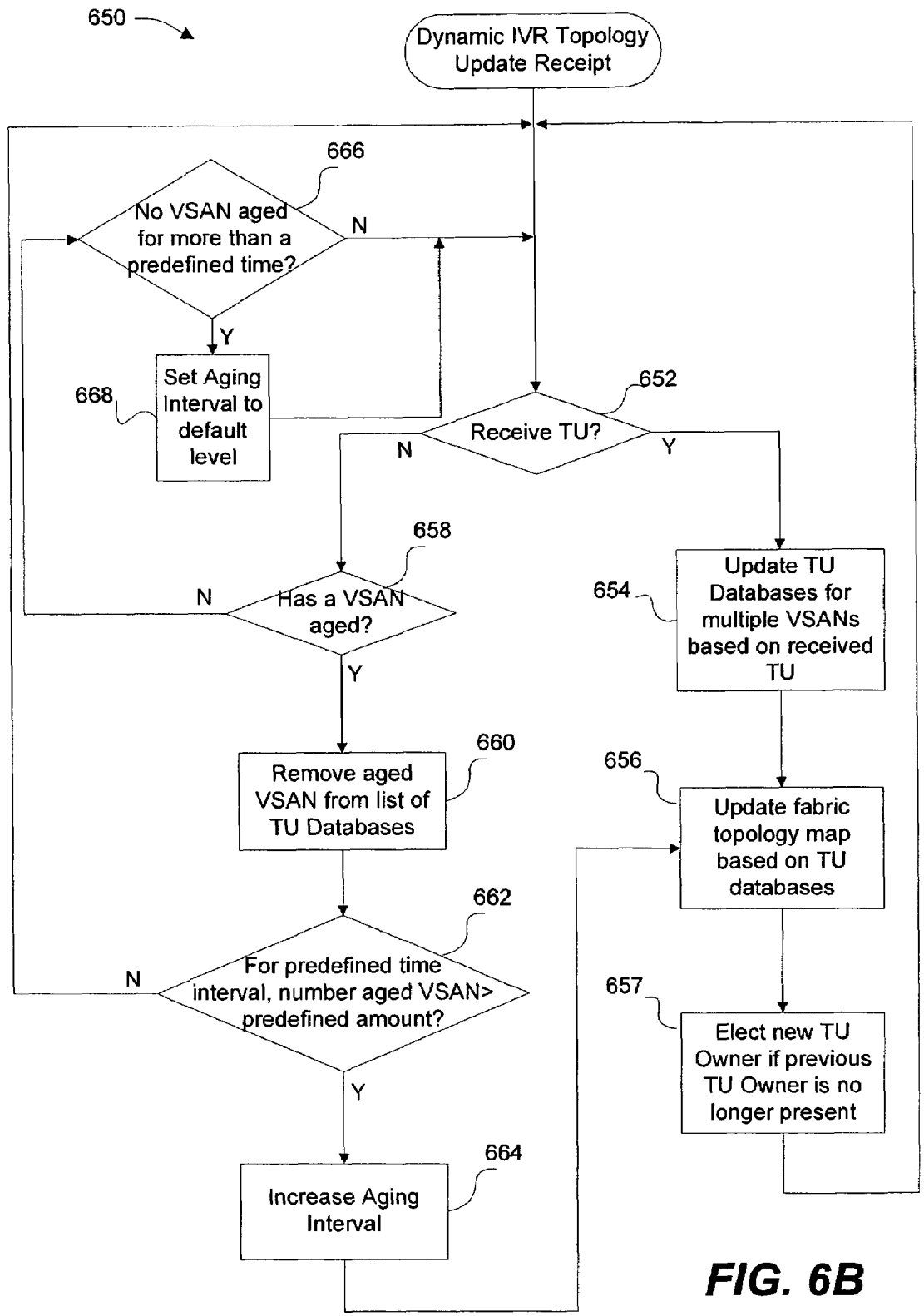
FIG. 6B is a flow chart illustrating a procedure for receiving dynamic IVR topology updates (TUs) from multiple VSANs in accordance with one embodiment of the present invention.
Figure 6C:
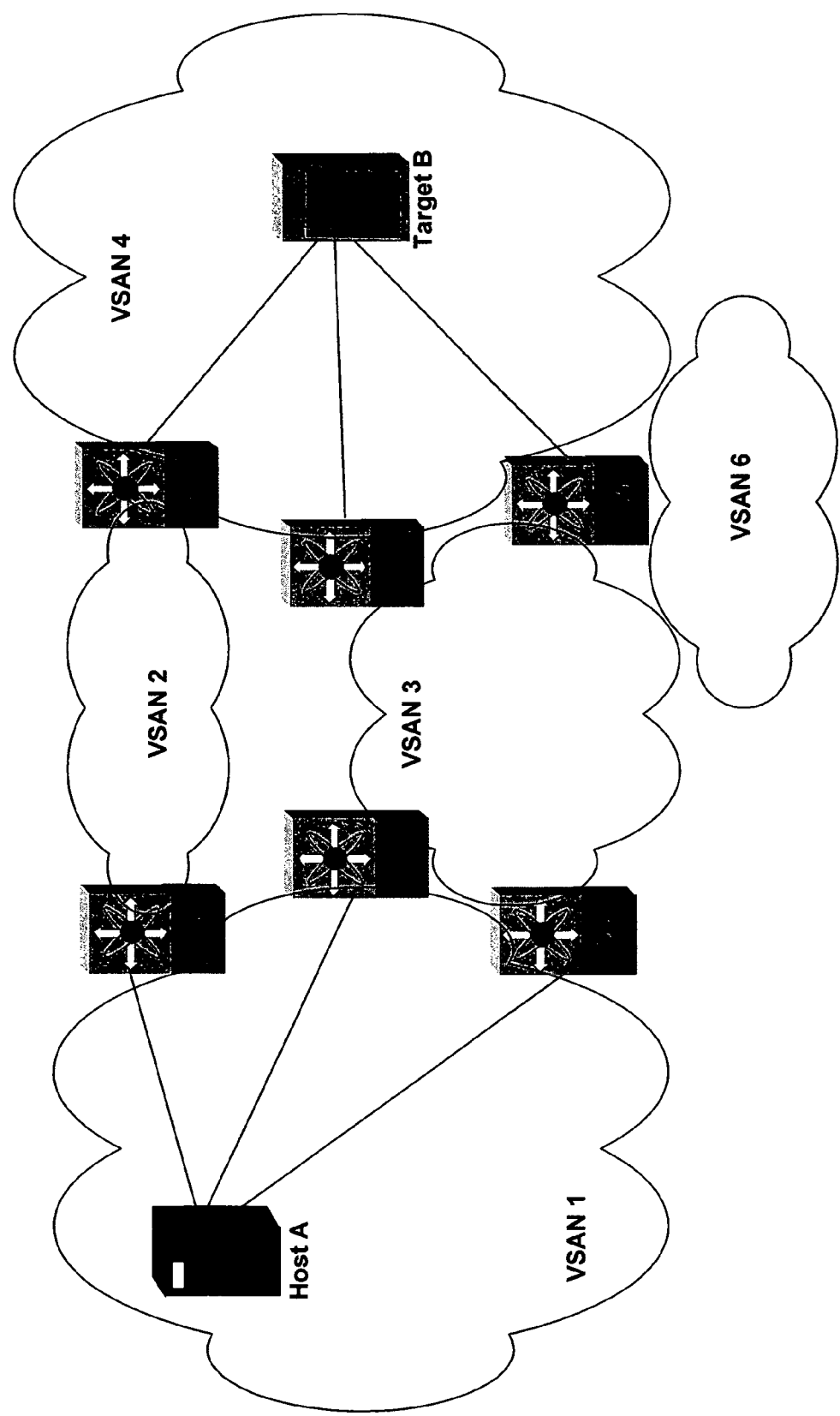
FIG. 6C illustrates an example fabric having multiple VSANs.
Figure 6D:
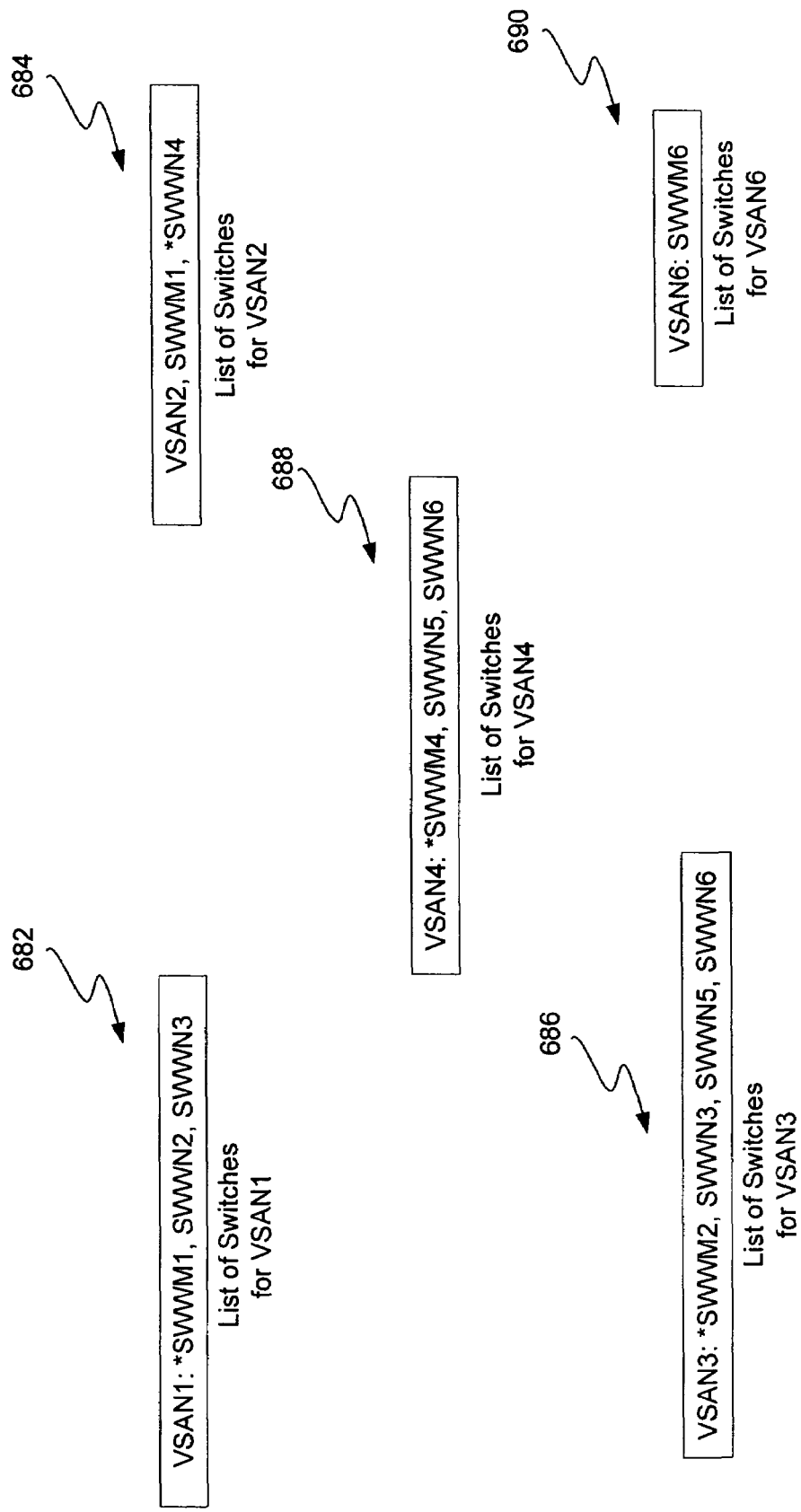
FIG. 6D is a diagrammatic representation of TU tables for the VSANs of FIG. 6C in accordance with one implementation of the present invention.

FIG. 6D is a diagrammatic representation of TU tables for the VSANs of FIG. 6C in accordance with one implementation of the present invention. In this implementation, each table lists the particular VSAN and its IVR enabled switches' world wide names (SWWM). Additionally, each table may include a marker, such as "*", to indicate the TU Owner for the corresponding VSAN. As shown, TU table 682 corresponds to VSAN1 and lists SWWM1 for switch S1, SWWM2 for switch S2, and SWWM3 for switch S3. Switch S1 is marked with an "*" to indicate that it is the TU Owner for VSAN1. TU table 684 corresponds to VSAN2 and lists SWWM1 for switch S1 and SWWM4 for switch S4 and marks switch S4 with an "*" as the TU Owner of VSAN2. TU table 686 corresponds to VSAN3 and lists SWWM2 for switch S2, SWWM3 for switch S3, SWWM5 for switch S5, and SWWM6 for switch S6 and marks switch S2 with an "*" as the TU Owner of VSAN3. TU table 688 corresponds to VSAN4 and lists SWWM4 for switch S4, SWWM5 for switch S5, and SWWM6 for switch S6 and marks switch S4 with an "*" as the TU Owner of VSAN4. TU table 690 corresponds to VSAN6 and lists SWWM6 for switch S6, which is also marked with an "*" to indicate that switch S6 is the TU Owner of VSAN6.

FIG. 6B is a flow chart illustrating a procedure 650 for receiving dynamic IVR topology updates (TUs) from multiple VSANs in accordance with one embodiment of the present invention. Since each VSAN will have a TU Owner that is sending TU updates to every switch in the fabric, each switch that implements this procedure 600 will periodically receive TU's from each VSAN that is still present in the fabric. In this embodiment, it is assumed that at least one TU has to be received before aging handling procedures may be performed. Accordingly, in the illustrated embodiment it is first determined whether a TU has been received in operation 652.

When a TU is received, the receiving switch then updates its TU databases or tables for the multiple VSANs in the fabric based on the received TU database in operation 654. The receiving switch then updates its fabric topology map based on its updated TU Databases in operation 656. For example, the topology of the fabric is determined based on the TU tables received from the TU Owners of the multiple VSANs and this topology may be represented graphically, e.g., as shown in FIG. 6C. In the illustrations of FIGS. 6C and 6D, the receiving switch can determine that switch S1 is listed in the TU tables for VSAN1 (682) and VSAN2 (684). Accordingly, it may be determined that S1 is a border switch that resides between VSAN1 and VSAN2.

A topology update may originate from a TU Owner in the same or a different VSAN and list the switches for a particular VSAN or may originate from a switch in the same VSAN as the receiving switch and list the LSRs of the transmitting switch. In the former case, it may be determined that a new TU Owner needs to be elected in the same VSAN as the receiving switch if the previous TU Owner is no longer present. For example, the receiving switch may determine from the received LSR updates that the former TU Owner is no longer present within the VSAN topology. If this is the case, a new TU Owner may be elected in operation 657 based on any suitable criteria as described above. The procedure 650 the repeats and it is again determined whether a TU has been received.

If a TU has not been received, it may then be determined whether a VSAN has aged out in operation 658. When a TU has not been received from a formerly active VSAN for more than a predetermined Aging Interval, it may be determined that the VSAN is no longer present and should be aged out of the fabric topology databases. When a VSAN has aged, the aged VSAN is removed from the receiving switches list of TU databases in operation 660.

In an optional implementation, the Aging Interval is variable and adaptable based on conditions. This is because if a fabric is under heavy load, some TUs may be getting delayed or dropped. If a short Aging Interval is used, then it would cause too many TUs to be "aged" and VSAN would be removed from the topology due to this false alarm. On the other hand, if the Aging Interval is too long, it would take a long time to detect when a VSAN actually needs to be removed. To solve this problem, It may then optionally be determined whether the number of aged TUs for a predefined time interval, e.g., 6× Refresh Interval, has exceeded a predefined amount, e.g., 6 TUs, in operation 662 and the Aging Interval is increased in operation 664 if this is true (since this may be happening due to fabric load).

The Aging Interval decreases to its normal value if no "aged" TUs are encountered for a while, which time duration depends on the particular aspects of the network. In the illustrated example, if a VSAN has not aged, it may then be determined whether no VSAN has aged for more than a predefined time, e.g., 8× Refresh Interval in operation 666. If this is true, the Aging Interval may then be reset to its default level in operation 668. Alternatively, the Aging Interval may be adjusted up and down in any suitable time increments as the number of aged VSANs changes over time. After the Aging Interval has been adjusted or it has been determined that such adjustment is unnecessary, the procedure 650 the repeats and it is again determined whether a TU has been received.

Figure 7:
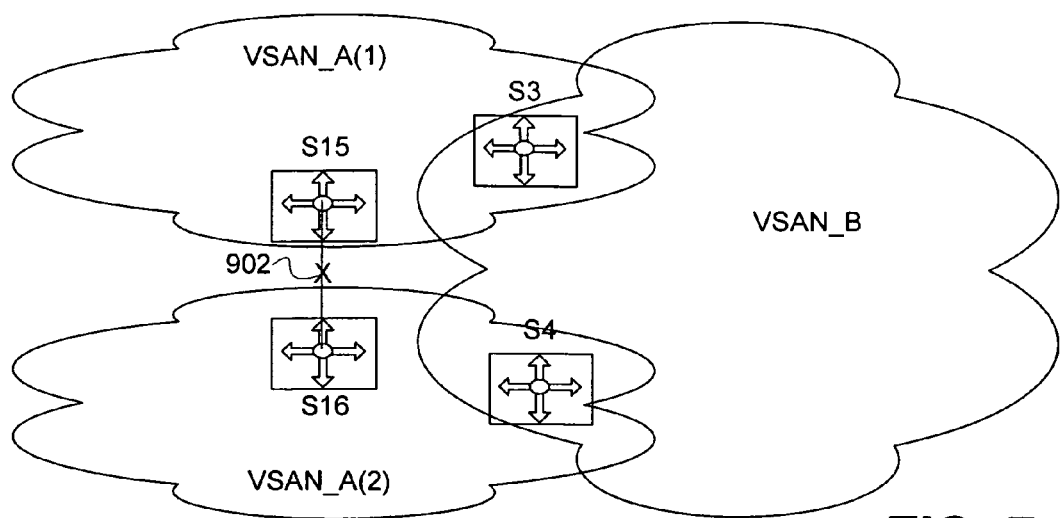
FIG. 7 is a diagrammatic representation of a VSAN_A that has segmented into two portions VSAN_A(1) and VSAN_A(2) because a link 902 has failed between two switches.

A VSAN may segment into two or more non-communicating portions when a link fails. FIG. 7 is a diagrammatic representation of a VSAN_A that has segmented into two portions VSAN_A(1) and VSAN_A(2) because a link 902 has failed between switches S15 and S16 of former VSAN_A. In this case, traffic may incorrectly be routed to a device in VSAN_A(1) via switch S3 when the device actually resides in VSAN_A(2). This may happen because the border switches are only aware of a single VSAN_A and its included devices and that this VSAN_A is coupled to VSAN_B through both switches S3 and S4. Thus, a border switch, such as S4, may incorrectly determine that it can route packets to all devices in former VSAN_A when it only can route to segment VSAN(2).

Figure 8:
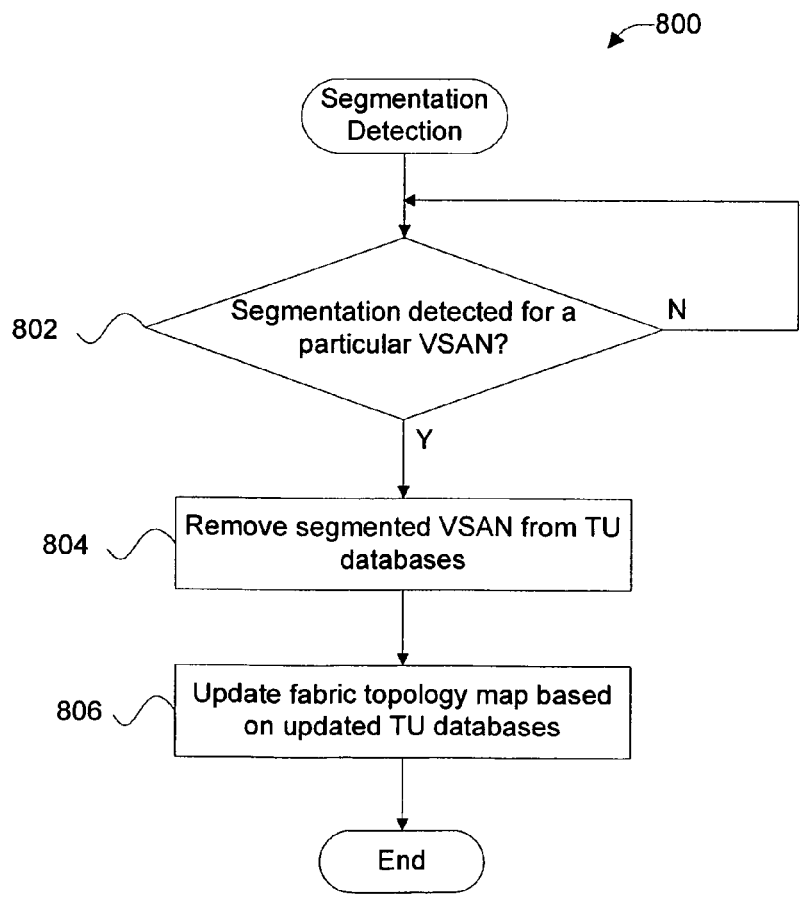
FIG. 8 is a flow chart illustrating a procedure for detecting segmentation of a VSAN in accordance with one implementation of this aspect of the invention.

If a switch "continuously" receives TU for the same VSAN from multiple TU Owners (based on different marked SWWNs), it may deduce that this VSAN must have segmented. FIG. 8 is a flow chart illustrating a procedure 800 for detecting segmentation of a VSAN in accordance with one implementation of this aspect of the invention. Initially, it may be determined whether segmentation of a particular VSAN has been detected in operation 802. It may be only determined that segmentation has, in fact, occurred after the detected segmentation is "continuous" since there can be transient cases (when a TU Owner changes) where a switch may receive the TU for the same VSAN from multiple TU Owners. However, in these transient cases, all the TU from all owners except one would eventually age out. However, if after a certain time interval e.g., Aging Interval+30 seconds, the switch still has TU for the same VSAN from multiple TU owners, the switch may determine that this behavior is due to VSAN segmentation. When segmentation is detected, the segmented VSAN may simply be removed from the detecting switch's list of TU databases and its topology is updated in operation 804 and 806, respectively. In this way, problems arising from segmentation may be avoided.

Figure 9:
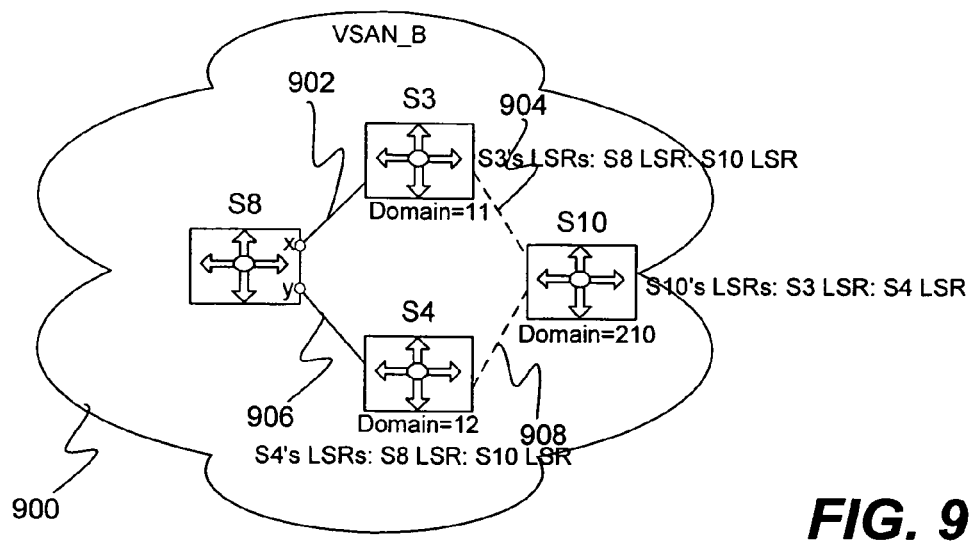
FIG. 9 is a diagrammatic representation of the propagation of disk D1 VSAN_B of FIG. 1 in accordance with one embodiment of the present invention.
Figure 10:
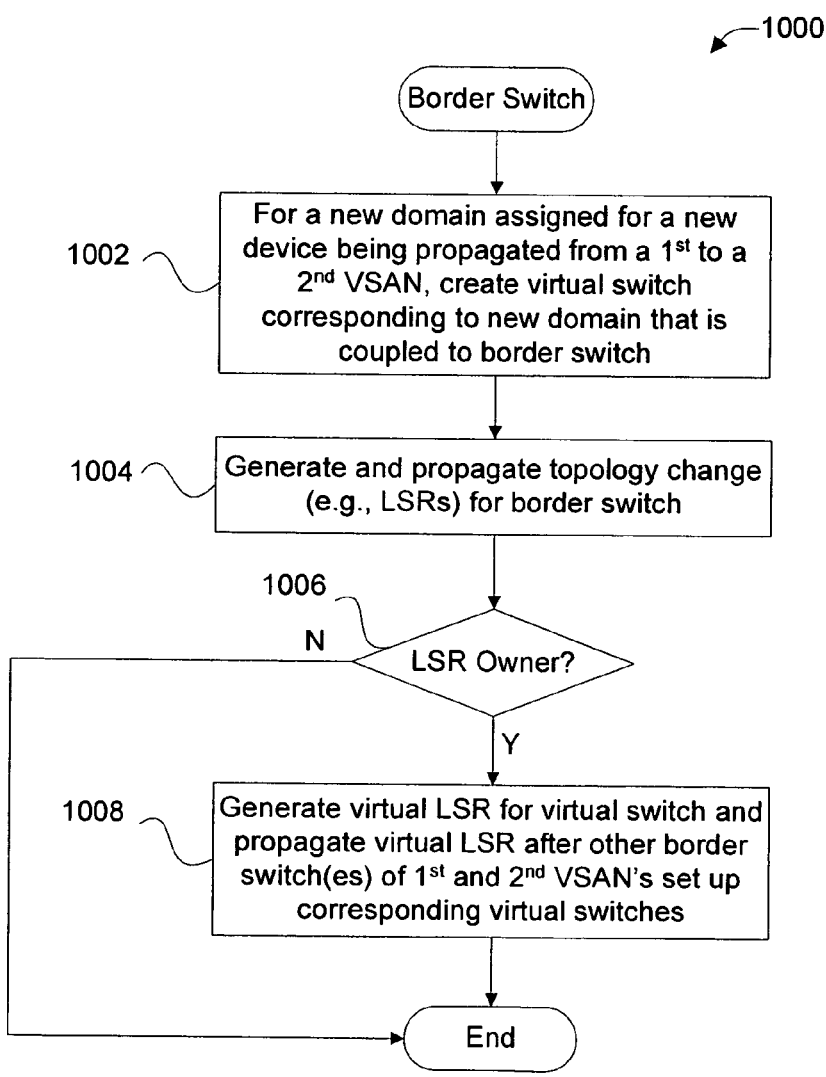
FIG. 10 is a flow chart illustrating a procedure for handling a topology change caused by the propagation of a new device's presence into a particular VSAN in accordance with one embodiment of the present invention.

In another IVR topology propagation aspect, when a new device is propagated from a first VSAN to an adjacent VSAN using NAT as described above, the routing topology of the adjacent VSAN is also affected by the new device's presence in such adjacent VSAN and this change needs to be propagated through the adjacent VSAN. FIG. 9 is a diagrammatic representation of the propagation of disk D1 VSAN_B of FIG. 1 in accordance with one embodiment of the present invention. FIG. 10 is a flow chart illustrating a procedure 1000 for handling a topology change caused by the propagation of a new device's presence into a particular VSAN in accordance with one embodiment of the present invention. This procedure is implemented in each border switch and is described in conjunction with the example of FIG. 9.

Initially, for a new domain that is assigned for a new device being propagated from a first into the particular VSAN, a virtual switch is created in the particular VSAN in operation

1002. As shown in FIG. 9, a new device has been propagated into a VSAN_B 900 from an adjacent VSAN (not shown). Specifically, information regarding this new device has reached two border switches S3 and S4 of VSAN_B and in response, both switches S3 and S4 have cooperatively set up a virtual switch S10 having domain "210" to represent the new device propagated into VSAN_B. This virtual switch S10 corresponds to the new domain "210" and is coupled to each border switch.

The topology change that includes the new virtual switch is then generated and propagated for the border switch in operation 1004. For example, LSRs (including a link and cost of such link) for the border switch are propagated using FSPF. In the example of FIG. 9, switch S3 propagates LSRs for the links to switches S8 and S10, while switch S4 propagates LSRs for the links to switches S8 and S10.

It is then determined whether the current switch is an LSR Owner in operation 1006. In the present example, switch S3 has been designated the LSR Owner. Preferably, there is only a single LSR Owner among the border switches residing between two VSANs. The LSR Owner may be designated in any suitable manner, similar to the techniques above described for designating a TU Owner. For the switch that is the LSR Owner, it generates a virtual LSR for the virtual switch and propagates this virtual LSR (and optionally after the other peer border switches set up their links to the same virtual switch) in operation 1008. For example, border switch S3 is designated as the LSR Owner and, accordingly, it is the only switch (and not S4) that generates a virtual LSR for link 908 and link 904 of virtual switch S10.

The techniques of the present invention may be implemented in any suitable combination of hardware and software. For example, they can be implemented in an operating system kernel, in a separate user process, in a library package bound into network applications, on a specially constructed machine, or on a network interface card. In a specific implementation, they are implemented on a fabric switch of a storage area network.

In one implementation, the switch includes at least one memory device and at least one processor. The memory and processor are operable to perform any of the above described techniques, as well as standard switching/routing operations, virtualization management, zone management, etc.

Figure 11:
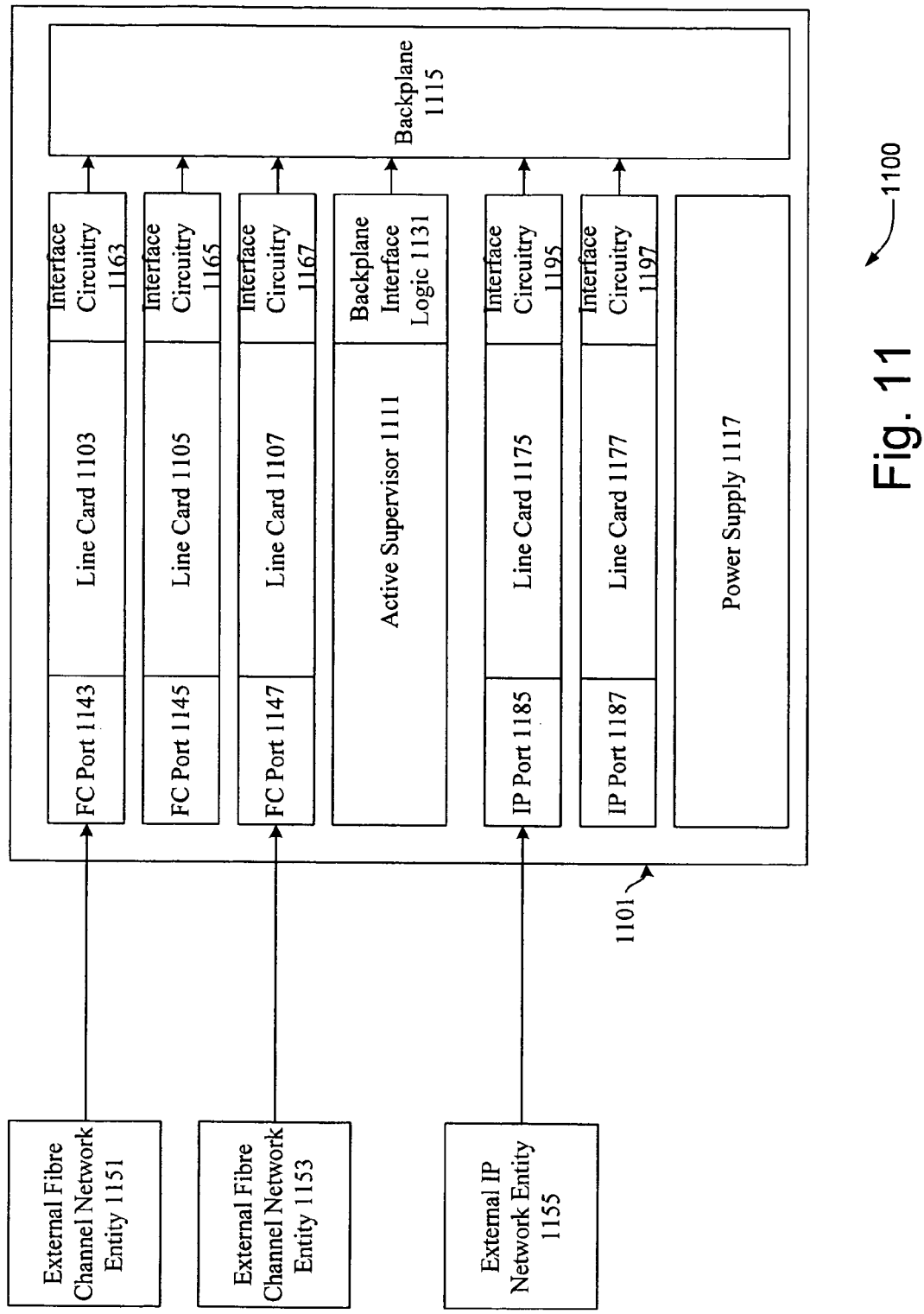
FIG. 11 is a diagrammatic representation of one example of a Fibre Channel switch that can be used to implement techniques of the present invention.

FIG. 11 is a diagrammatic representation of one example of a fibre channel switch that can be used to implement techniques of the present invention. Although one particular configuration will be described, it should be noted that a wide variety of switch and router configurations are available. The switch 1101 may include one or more supervisors 1111 and power supply 1117. According to various embodiments, the supervisor 1111 has its own processor, memory, and storage resources.

Line cards 1103, 1105, and 1107 can communicate with an active supervisor 1111 through interface circuitry 1163, 1165, and 1167 and the backplane 1115. According to various embodiments, each line card includes a plurality of ports that can act as either input ports or output ports for communication with external fibre channel network entities 1151 and 1153. The backplane 1115 can provide a communications channel for all traffic between line cards and supervisors. Individual line cards 1103 and 1107 can also be coupled to external fibre channel network entities 1151 and 1153 through fibre channel ports 1143 and 1147.

External fibre channel network entities 1151 and 1153 can be nodes such as other fibre channel switches, disks, RAIDS, tape libraries, or servers. The fibre channel switch can also include line cards 1175 and 1177 with IP ports 1185 and 1187. In one example, IP port 1185 is coupled to an external IP network entity 1155. The line cards 1175 and 1177 also have interfaces 1195 and 1197 to the backplane 1115.

It should be noted that the switch can support any number of line cards and supervisors. In the embodiment shown, only a single supervisor is connected to the backplane 1115 and the single supervisor communicates with many different line cards. The active supervisor 1111 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

Regardless of fabric switch's configuration, it may employ one or more memories or memory modules configured to store data, database(s), and program instructions for the general-purpose network operations and/or the inventive techniques described herein. The program instructions may control the operation of an operating system and/or one or more applications, for example. The memory or memories may also be configured to store name server, NAT tables, TU databases, topology maps, routing information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of routing data between different virtual storage area networks (VSANs), the method comprising:
   (a) at a border network device that belongs to a first VSAN and a second VSAN, receiving data from a network device of the first VSAN that indicates that a new device has joined the first VSAN and such received data provides a first Fibre Channel identifier (FCID) for the new device, wherein the first FCID is usable to address the new device in the first VSAN;
   (b) when the new device is authorized to communicate with a remote device and the border network device is positioned in a path between the new device's first VSAN and the remote device's VSAN, assigning a second FCID for use in a second VSAN that is adjacent to the first VSAN so that the assigned second FCID is based on a domain that is unused by a local switch in the second VSAN and is unique in the second VSAN, whereby such assigning operation is caused by the receipt of the data, at the border network device of the first and second VSAN, that indicates that the new device has joined the first VSAN;
   (c) storing a binding between the first and second FCID for later use by the border network device for translating between the first and second FCID for data subsequently received into the border network device; and
   (d) informing other network devices in the second VSAN of the new device and its second FCID, wherein the informing is performed by the border network device so as to inform any other network devices that belong to the second VSAN and so as to inform any other border network devices that belong to both the second VSAN and one or more other VSANs.

2. A method as recited in claim 1, wherein a domain identifier of the second FCID is predefined by a user.

3. A method as recited in claim 1, wherein selection of a domain identifier of the second FCID is predefined by a user.

4. A method as recited in claim 1, wherein the binding between the first and second FCID is stored in a NAT (network address translation) table associated with the border network device.

5. A method as recited in claim 4, further comprising updating a first name server directory listing registered devices in the first VSAN and a second name server listing devices registered in the second VSAN.

6. A method as recited in claim 1, further comprising:
   when data is received into the border network device from the new device in the first VSAN and the data's destination is in the second VSAN or in another VSAN that can be reached through the border network device, translating a source FCID of the data from the first FCID to the second FCID based on the stored binding for the new device and then forwarding the data towards the new device; and
   when data is received into the border network device from the second VSAN and it's the data's destination is the new device in the first VSAN, translating a destination FCID of the data from the second FCID to the first FCID based on the stored binding for the new device and then forwarding the data towards its destination.

7. A method as recited in claim 1, wherein the new device corresponds to a physical device that is not positioned in the first or second VSAN, but resides in a third VSAN located by traversing the first and/or second VSAN, and wherein the new device's joining of the first VSAN was accomplished by performing operations (a) through (d) with respect to the third and first VSANs.

8. A method as recited in claim 1, wherein the operation (b) is only performed if it is determined that none of the other one or more border network devices in the first and second VSAN have initiated handling of the new device and the method further comprising:
   when it is determined that another border network device in the first and second VSAN has initiated handling of the new device, receiving a second FCID from another border network device of the first and second VSAN for the new device's representation in the second VSAN; and
   when it is not determined that another border network device in the first and second VSAN has initiated handling of the new device, sending the binding between the first and second FCID to one or more other border network devices that reside in the first and second VSANs.

9. A method as recited in claim 8, wherein operation (d) is only performed after all of the other border network device(s) of the first and second VSAN have stored their bindings between the first and second FCID.

10. An apparatus adapted for routing data between different virtual storage area networks (VSANs), the apparatus being in the form of a border network device that belongs to a first VSAN and a second VSAN and comprising:
    one or more processors;
    one or more memory, wherein at least one of the processors and memory are adapted for:
    (a) receiving data from a network device of the first VSAN that indicates that a new device has joined the first VSAN and such received data provides a first Fibre Channel identifier (FCID) for the new device, wherein the first FCID is usable to address the new device in the first VSAN;
    (b) when the new device is authorized to communicate with a remote device and the border network device is positioned in a path between the new device's first VSAN and the remote device's VSAN, assigning a second FCID for use in a second VSAN that is adjacent to the first VSAN so that the assigned second FCID is based on a domain that is unused by a local switch in the second VSAN and is unique in the second VSAN whereby such assigning operation is caused by the receipt of the data, at the border network device of the first and second VSAN, that indicates that the new device has joined the first VSAN;
    (c) storing a binding between the first and second FCID for later use by the border network device for translating between the first and second FCID for data subsequently received into the border network device; and
    (d) informing other network devices in the second VSAN of the new device and its second FCID, wherein the informing is performed by the border network device so as to inform any other network devices that belong to the second VSAN and so as to inform any other border network devices that belong to both the second VSAN and one or more other VSANs.

11. An apparatus as recited in claim 10, wherein a domain identifier of the second FCID is predefined by a user.

12. An apparatus as recited in claim 10, wherein selection of a domain identifier of the second FCID is predefined by a user.

13. An apparatus as recited in claim 10, wherein the binding between the first and second FCID is stored in a NAT (network address translation) table associated with the border network device.

14. An apparatus as recited in claim 13, wherein at least one of the processors and memory are further adapted for updating a first name server directory listing registered devices in the first VSAN and a second name server listing devices registered in the second VSAN.

15. An apparatus as recited in claim 10, wherein at least one of the processors and memory are further adapted for:
   when data is received into the border network device from the new device in the first VSAN and it's the data's destination is in the second VSAN or in another VSAN that can be reached through the border network device, translating a source FCID of the data from the first FCID to the second FCID based on the stored binding for the new device and then forwarding the data towards the new device; and
   when data is received into the border network device from the second VSAN and the data's destination is the new device in the first VSAN, translating a destination FCID of the data from the second FCID to the first FCID based on the stored binding for the new device and then forwarding the data towards its destination.

16. An apparatus as recited in claim 10, wherein the new device corresponds to a physical device that is not positioned in the first or second VSAN, but resides in a third VSAN located by traversing through the first and/or second VSAN, and wherein the new device's joining of the first VSAN was accomplished by performing operations (a) through (d) with respect to the third and first VSANs.

17. An apparatus as recited in claim 10, wherein the operation (b) is only performed if it is determined that none of the other one or more border network devices in the first and second VSAN have initiated handling of the new device and wherein at least one of the processors and memory are further adapted for:
   when it is determined that another border network device in the first and second VSAN has initiated handling of the new device, receiving a second FCID from another border network device of the first and second VSAN for the new device's representation in the second VSAN; and
   when it is not determined that another border network device in the first and second VSAN has initiated handling of the new device, sending the binding between the first and second FCID to one or more other border network devices that reside in the first and second VSANs.

18. An apparatus as recited in claim 17, wherein operation (d) is only performed after all of the other border network device(es) of the first and second VSAN have stored their bindings between the first and second FCID.

19. An apparatus for routing data between different virtual storage area networks (VSANs), the apparatus being in the form of a border network device that belongs to a first VSAN and a second VSAN and comprising:
   means for, at the border network device, receiving data from a network device of the first VSAN that indicates that a new device has joined the first VSAN and such received data provides a first Fibre Channel identifier (FCID) for the new device, wherein the first FCID is usable to address the new device in the first VSAN;
   means for when the new device is authorized to communicate with a remote device and the border network device is positioned in a path between the new device's first VSAN and the remote device's VSAN, assigning a second FCID for use in a second VSAN that is adjacent to the first VSAN so that the assigned second FCID is based on a domain that is unused by a local switch in the second VSAN and is unique in the second VSAN whereby such assigning operation is caused by the receipt of the data, at the border network device of the first and second VSAN, that indicates that the new device has joined the first VSAN;
   means for storing a binding between the first and second FCID for later use by the border network device for translating between the first and second FCID for data subsequently received into the border network device; and
   means for from the border network device, informing other network devices in the second VSAN of the new device and its second FCID so as to inform any other network devices that belong to the second VSAN and so as to inform any other border network devices that belong to both the second VSAN and one or more other VSANs.

20. A system for routing data between different virtual storage area networks (VSANs), comprising:
   a plurality of VSANs, wherein each VSAN is coupled to at least one other VSAN, wherein each adjacent pair of VSANs includes at least one border network device, and each VSAN includes one or more host(s) and/or storage disk(s),
   wherein the border network devices are each configured to facilitate communication between authorized hosts and/or disks across multiple VSANs, wherein each border network device is operable to:
   (a) at such each border network device that belongs to a first VSAN and a second VSAN, receive data from a network device of the first VSAN that indicates that a new device has joined the first VSAN and such received data provides a first Fibre Channel identifier (FCID) for the new device, wherein the first FCID is usable to address the new device in the first VSAN;
   (b) when the new device is authorized to communicate with a remote device and the each border network device is positioned in a path between the new device's first VSAN and the remote device's VSAN, assign a second FCID for use in a second VSAN that is adjacent to the first VSAN so that the assigned second FCID is based on a domain that is unused by a local switch in the second VSAN and is unique in the second VSAN whereby such assigning operation is caused by the receipt of the data, at the each border network device of the first and second VSAN, that indicates that the new device has joined the first VSAN;
   (c) store a binding between the first and second FCID for later use by the each border network device for translating between the first and second FCID for data subsequently received into the border network device; and
   (d) from the each border network device, inform other network devices in the second VSAN of the new device and its second FCID so as to inform any other network devices that belong to the second VSAN and so as to inform any other border network devices that belong to both the second VSAN and one or more other VSANs.

21. A method as recited in claim 1, wherein the second FCID shares a domain portion of the second VSAN.

22. An apparatus as recited in claim 10, wherein the second FCID shares a domain portion of the second VSAN.

* * * * *

UNITED STATES PATENT AND TRADEMARK OFFICE
CERTIFICATE OF CORRECTION

PATENT NO.        : 7,644,179 B1                                    Page 1 of 1
APPLICATION NO.   : 11/292684
DATED             : January 5, 2010
INVENTOR(S)       : Jain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Twenty-first Day of December, 2010

David J. Kappos
*Director of the United States Patent and Trademark Office*